Figure 1:
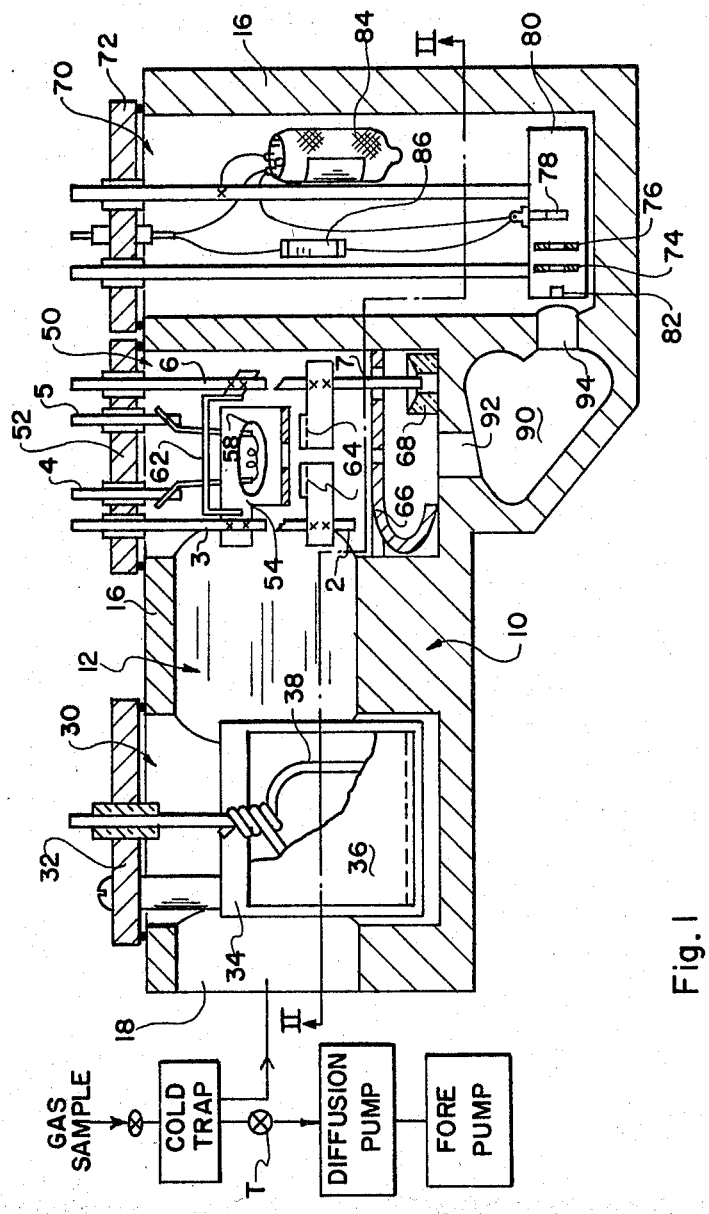

Aug. 9, 1966    W. E. BRIGGS    3,265,890
MASS SPECTROMETER LEAK DETECTOR
Filed Dec. 20, 1963    3 Sheets-Sheet 2

Aug. 9, 1966     W. E. BRIGGS     3,265,890
MASS SPECTROMETER LEAK DETECTOR
Filed Dec. 20, 1963     3 Sheets-Sheet 3

United States Patent Office 3,265,890
Patented August 9, 1966

3,265,890
MASS SPECTROMETER LEAK DETECTOR
Walton E. Briggs, Lynnfield, Mass., assignor to National Research Corporation, Cambridge, Mass., a corporation of Massachusetts
Filed Dec. 20, 1963, Ser. No. 332,154
4 Claims. (Cl. 250—41.9)

The present invention relates to an improved construction of vacuum apparatus and more particularly to an improved construction of a mass spectrometer leak detector.

Mass spectrometer leak detection has been a familiar technique in the vacuum art since first practiced at the University of Minnesota in 1943. A mass spectrometer is set to detect a probe gas, such as helium, and the probe gas is applied to the main vacuum system under investigation. The mass spectrometer samples gas from the pumping line of the system under investigation. A separate pumping system is provided for the mass spectrometer and a throttle valve couples the mass spectrometer to the main vacuum system.

It is a principal object of the invention to provide an improved mass spectrometer leak detector of simple construction with adequate sensitivity for its leak detection function.

In general, this object is accomplished by providing a thin, vacuum tight leak detector member with an external magnet. The member and magnet are of simple construction. The leak detector electrodes are supported in the member by vacuum feedthroughs. Magnetic focusing is used in the ionization portion of the leak detector. The ion source electrodes are made in the form of a disposable construction. The alignment of the electrodes with the member is non-critical. Adequate sensitivity is achieved by adjusting the magnetic field outside the vacuum and by the ion source construction described below.

A further object of the invention is to limit carbonization of the mass spectrometer electrodes from hydrocarbons which enter the ion source along with the probe gas.

In general, this object is accomplished by the simple expedient of placing an ionization gauge in gas flow series between the pumping systems and the spectrometer electrodes. The gauge is employed in parallel with the spectrometer in the prior art and some other technique must be employed for avoiding carbonization. Many of these techniques are described in U.S. Patent 2,838,676.

A further object of the invention is to provide a mass spectrometer leak detector member, with internal Phillips gauge, of compact construction with easy access to all parts which must be serviced.

The member has the form of a thin box with opposed parallel faces and narrow side walls. The magnet comprises a yoke and pole plates straddling the faces. Pairs of pole extensions extend inwardly from the pole plates to concentrate magnetic fields in the gauge, ion source and analyzer portions of the member. Demountable vacuum feedthroughs support a Phillips gauge, an ion source and a collector in an internal cavity of the body. The feedthroughs are in a side wall and in close proximity to each other.

The magnet can be assembled with the member and placed in a leak detector cabinet with the feedthroughs being accessible for ease of servicing. Then the magnetic field is adjusted during operation of the leak detector to establish a desired sensitivity of the ion source.

Other objects of the invention will in part be obvious and will in part appear hereinafter.

The invention accordingly comprises an improved machine possessing the construction and arrangement of parts exemplified in the following detailed disclosure and the accompanying drawings and the scope of application of which will be indicated in the claims.

Figure 2:
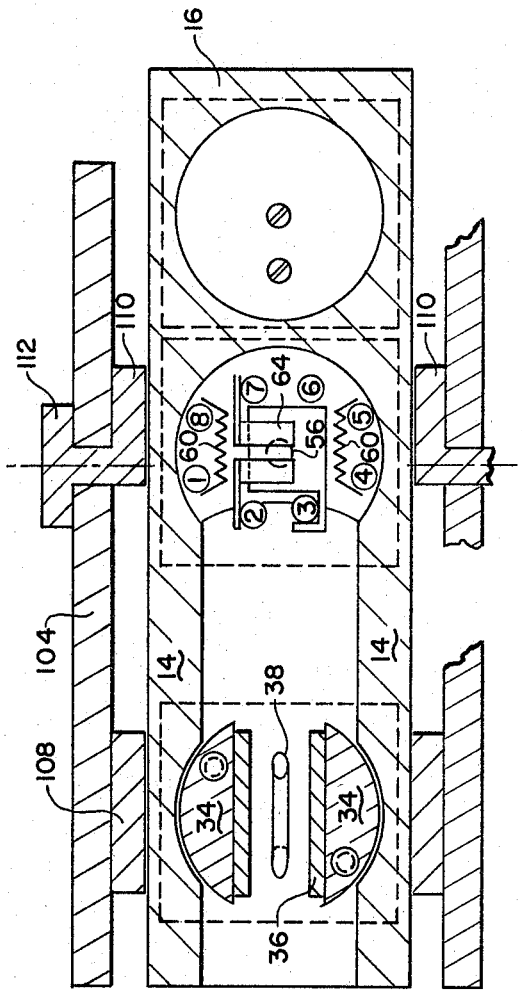
Figure 4:
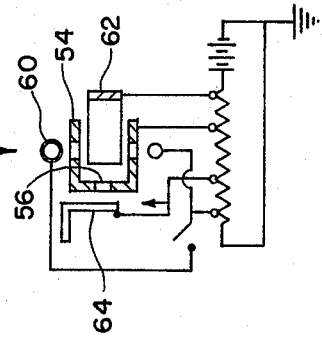
Figure 3:
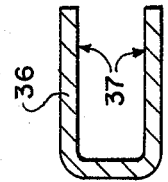
Figure 5:
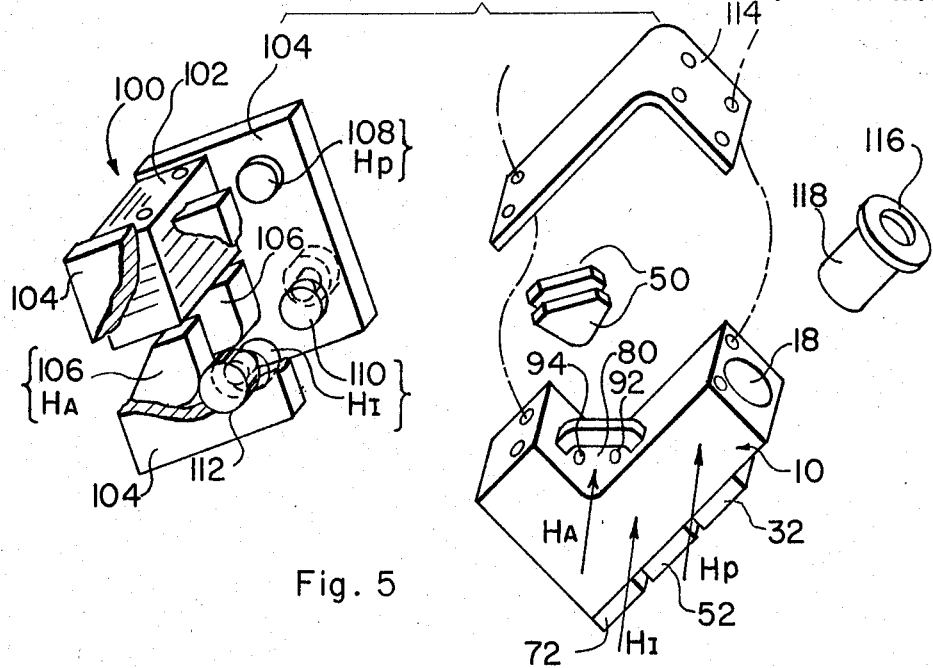
Figure 6:
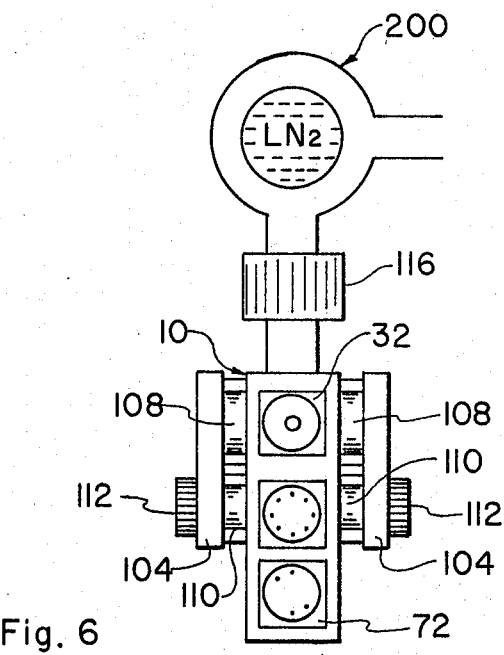

FIG. 1 is a sectional view showing the arrangement of spectrometer parts in the body member;
FIG. 2 is a sectional view transverse to FIG. 1;
FIG. 3 shows the construction of the Phillips gauge cathode;
FIG. 4 indicates the arrangement of parts in the ion source;
FIG. 5 is an isometric, exploded view of the body member and magnet assemblies; and
FIG. 6 is a top view of the assembled leak detector.

The leak detector vacuum system is shown in black box form since such systems are well known in the art. Gas is sampled from the foreline of a vacuum system under investigation to a leak detector pumping system which includes a liquid nitrogen cold trap, a small diffusion pump (2 inches nominal diameter) and a small forepump. A proportion of sampled gas is introduced to the mass spectrometer body member by using an adjustable throttle valve T to limit the diffusion pump.

The body member comprises a solid block 10. Crossing holes are machined through the block to define an internal cavity 12 which serves as the gas flow path of the spectrometer. The cavity is enclosed by parallel, opposed planar faces 14 spanned by narrow side walls 16. A gas flow opening 18 extends through a side wall to the cavity. Auxiliary openings 30, 50 and 70 also extend through a side wall to the cavity.

Ionization gauge

A phillips gauge is supported on a demountable vacuum closure 32 for insertion and removal through opening 30. The Phillips gauge comprises a pair of semi-cylindrical pole pieces 34 for concentrating a magnetic field within the gauge portion of the cavity, a disposable cathode 36 which comprises a sheet bent to form two cathode faces 37 and a wire anode 38. The cathode 36 is sufficiently resilient to bear against its supporting magnet pole pieces 34. The anode and pole pieces are mounted in the closure 32. The body member 10, and consequently the cathode 36, are at ground potential. The anode 38 is maintained at a positive potential of about 2000 volts.

Ion source

An ion source is supported on a demountable vacuum closure 52 for insertion and removal through opening 50. The closure 52 comprises a conventional eight-pin vacuum tube feedthrough. The ion source comprises an ion chamber electrode 54 which is open to the flow of gas from the inlet opening 18 and the Phillips gauge. The ion chamber electrode has an ion exit slit 56 and upper and lower slits 58 for the admission of electrons. Upper and lower thermionic filaments 60 provide alternative sources of electrons for ionizing gas molecules in the ion chamber electrode region. One of the filaments is operated and the other is reserved as a spare. When the first filament burns out, the spare can then be switched on until it is convenient to break the vacuum and replace the entire ion source. The symmetrical alignment insures similar operating characteristics with either filament. Positively biased ion repeller electrode 62 is disposed in the ion chamber and opposite exit slit 56 to force a beam of ions out through the exit slit.

Focusing of the electrons is accomplished by a magnetic field disposed parallel to the aligned filaments 60. The space charge of the confined electron beam, in turn, aids in the focusing of the ion beam. The ion beam is further focused by cooperation of the ion repeller and ion chamber and by focus plates 64 disposed outside the ion chamber and in proximity to the exit slit 56.

Alignment of the ion source electrodes and construction of the ion source emphasizes ruggedness and economy. The ion source is designed as a throwaway unit to be replaced when the filaments burn out or excessive insulating deposits build up on the electrodes. In the prior art, magnetic focus ion sources have relatively expensive and careful design of the ion chamber and repeller and focus electrodes to assure proper alignment with an electrostatic or magnetic focus field. The filament must be provided in a replaceable form. The source construction and the adjustable magnetic field, described below, give sufficient sensitivity to the present ion source to allow a more rugged and inexpensive construction.

The electrodes are all spot welded to the pins 1–8. The filaments are supported on pins 1, 8, 4 and 5. The ion chamber electrode and repeller electrode are supported between the filaments by pins 3 and 6 respectively. Pins 2 and 7 are longer than the other pins and are utilized to support focus plates 64 beyond exit slit 56. The relative D.C. bias imposed on the respective electrodes is indicated by the schematic drawing of a voltage divider in FIG. 4.

Analyzer

The ion beam is segregated by mass/charge ratios in a 90° analyzer section 90 having an inlet port 92 and exit port 94. A ground slit plate 66 is disposed between the ion source and analyzer. A ceramic locating block 68 is secured in the cavity to locate the removable ion source with respect to the analyzer and the magnetic field. The fit between pin 7 of the ion source and locator 68 is a loose one, simply sufficient to obtain alignment of exit slit 56 of the ion source with the axes of ground plate 66 and port 92 within a few degrees tolerance.

The member 10 has its narrowest width in the region 90 to provide a minimum magnet gap for the external magnet. Face portions 50 of magnetic material are welded into position to concentrate a high field, on the order of 2000 gauss, through the analyzer portion.

Collector

Conventional collector electrodes and preamplifier circuitry are supported on a demountable vacuum closure 72 for insertion and removal through opening 70. The electrodes comprise a suppressor 74, a ground plate 76, and a collector plate 78, all supported in a collector tube 80 with an entrance port 82. A preamplifier tube 84 and its grid resistor 86 are supported in the cavity 12 by closure 72.

Magnet (FIGS. 2, 5)

The mass spectrometer mechanical assembly is shown in exploded form in FIG. 5. The magnet 100 comprises a yoke 102 and a pair of pole plates 104. Pairs of pole extensions 106, 108 and 110 extend inwardly from the plates to provide the magnetic fields for the analyzer ($H_A$), Phillips gauge ($H_p$) and ion source ($H_I$), respectively. Knurled handles 112 are provided for rotating the magnet pole extensions 110 to vary the sensitivity of the ion source.

The yoke 102 is made of Alnico while the pole plates and pole extensions are of soft iron. This simple form of the magnet is made possible by the above-described narrow construction of the body, particularly of the analyzer portion 80.

A clamping bar secures the magnet 100 to the body 10. A conventional vacuum flange 116 and pipe 118 can be welded to inlet 18 to provide a demountable connection to the pumping system.

Accessibility

FIG. 6 shows the assembled mass spectrometer leak detector in operating position connected to the cold trap 200 of a conventional leak detector pumping and sample inlet system (such as that described by Thomas, Williams and Hipple in Review of Scientific Instruments, vol. 17, p. 368). The mass spectrometer and cold trap are recessed in a cabinet. The operator can reach down into the cabinet to turn knurled handles 112 to adjust the ion source sensitivity while the leak detector is operating or to replace the electrodes mounted on any of closures 32, 52, 72, without disturbing magnet 100. It would, of course, be necessary to break vacuum before removing any of the closures.

Certain changes can be made in the above described apparatus without departing from the scope of the invention herein involved. For instance, the cammed pole pieces 110 can be of other constructions which provide an adjustable magnetic field through the ion source without disturbing the analyzer and Phillips gauge magnet fields. Many of the structural concepts described above are of general utility in ion sources other than those used in leak detectors. Therefore, it is intended that the above description and accompanying drawings shall be interpreted as illustrative and not in a limiting sense.

What is claimed is:

1. An improvement in mass spectrometer apparatus comprising a series flow arrangement of at least one gas flow inlet for connecting the apparatus to a gas sample source and to vacuum pumping means for the spectrometer apparatus, an electrical ionization device of the cold cathode discharge type, and a hot filament ion source of the mass spectrometer and mass spectrometer analyzer and collector means, the improvement wherein the cold cathode discharge device is arranged in series between one gas flow inlet and the hot filament ion source to intercept and pump a substantial portion of carbonizing gasses entering the gas flow inlet whereby filament contamination and sensitivity loss are limited.

2. The apparatus of claim 1 wherein said cold cathode discharge device consists of a Phillips gauge.

3. The apparatus of claim 1 wherein the cold cathode discharge device, the ion source, the analyzer, the collector, and said inlet are in a common housing.

4. In the apparatus of claim 1 wherein the said gas flow inlet is the sole inlet of the apparatus for sampling and pumping, the improvement being further characterized in that the parts are arranged in a gas flow series of the inlet followed by the cold cathode discharge device followed by the ion source followed by the analyzer followed by the collector.

References Cited by the Examiner

UNITED STATES PATENTS

| | | | |
|---|---|---|---|
| 2,427,484 | 9/1947 | West | 250—41.9 |
| 2,490,278 | 12/1949 | Nier | 250—41.9 |
| 2,643,342 | 6/1953 | Simpson | 250—41.9 |
| 2,772,362 | 11/1956 | Dietz | 250—41.9 |
| 2,967,239 | 6/1961 | Zemany | 250—41.9 |
| 2,975,278 | 3/1961 | Brubaker et al. | 250—41.9 |

RALPH G. NILSON, *Primary Examiner.*

A. L. BIRCH, *Assistant Examiner.*